(12) United States Patent
Hung

(10) Patent No.: US 6,324,333 B1
(45) Date of Patent: Nov. 27, 2001

(54) COMMON LIGHT SOURCE FOR TESTING OPTICAL CIRCUITS

(76) Inventor: Henry H. Hung, 10850 N. 24th Ave., No. 101, Phoenix, AZ (US) 85029

( * ) Notice: Subject to any disclaimer, the term of this patent is extended or adjusted under 35 U.S.C. 154(b) by 0 days.

(21) Appl. No.: 09/726,918

(22) Filed: Nov. 30, 2000

(51) Int. Cl.$^7$ .................................................. G02B 6/00
(52) U.S. Cl. ................................. 385/147; 385/1; 385/14; 385/24
(58) Field of Search .................................... 385/14, 15, 1, 385/2, 3, 17, 18, 5, 24, 88, 89, 139, 147; 356/425; 250/227.11

(56) References Cited

U.S. PATENT DOCUMENTS

| 4,262,198 | * | 4/1981 | Gupta et al. .......................... 250/340 |
| 5,278,923 | * | 1/1994 | Nazarathy et al. ...................... 385/3 |
| 5,623,565 | * | 4/1997 | Blair et al. ............................ 385/24 |

* cited by examiner

Primary Examiner—Brian Healy
(74) Attorney, Agent, or Firm—Tod R. Nissle, P.C.

(57) ABSTRACT

A method and apparatus for testing a plurality of optical circuits provides a single broadband light source and means for splitting the light produced by the broadband light source in order to produce a plurality of light beams each of which is directed to a selected one of the plurality of optical circuits.

2 Claims, 1 Drawing Sheet

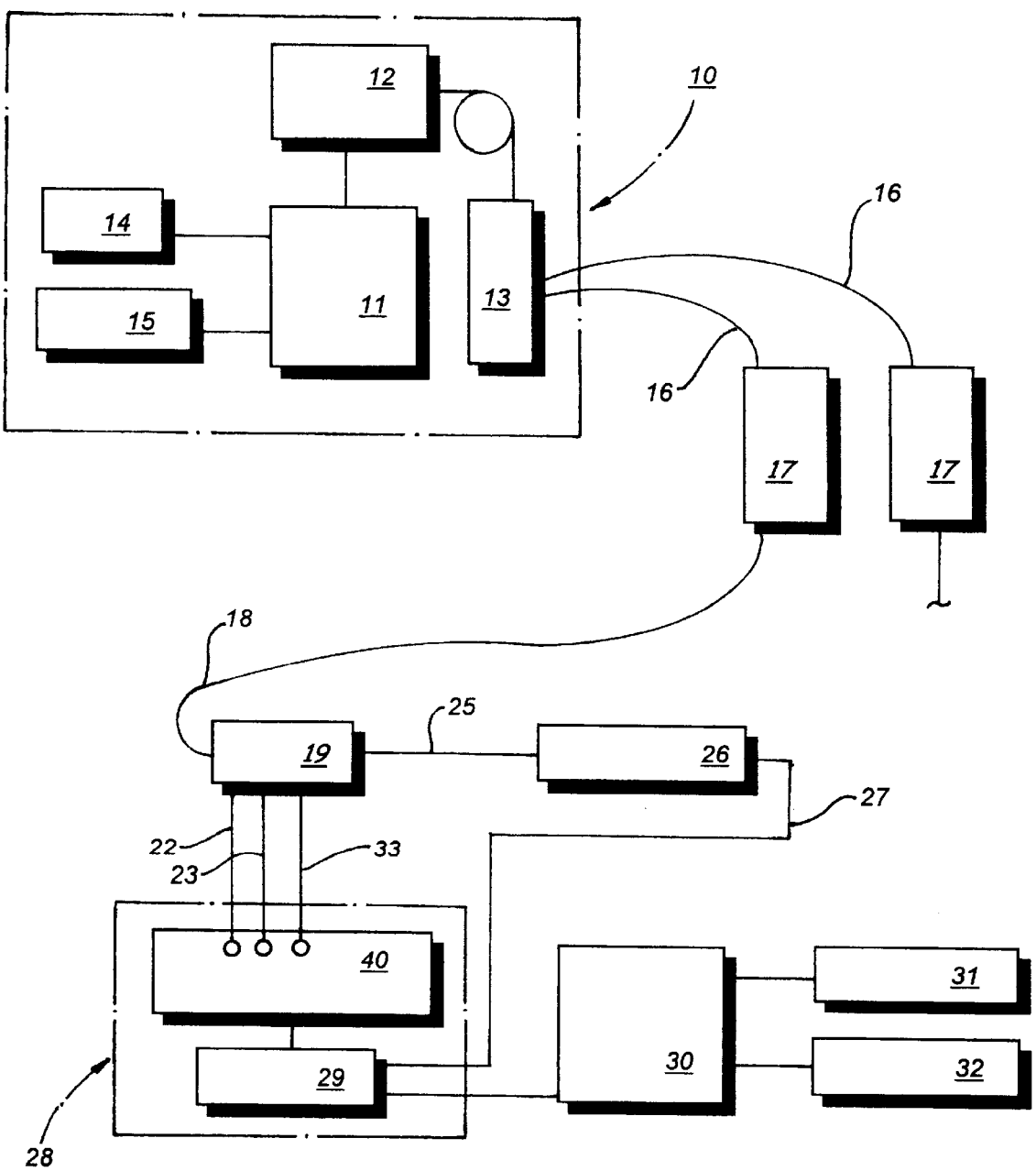

COMMON LIGHT SOURCE FOR TESTING OPTICAL CIRCUITS

BACKGROUND OF THE INVENTION

This invention relates to apparatus for testing an optical circuit.

More particularly, the invention relates to a light source for testing an optical circuit. Light is used to test integrated optic devices.

An integrated optic chip (IOC) is made of an electro-optic material whose index of refraction increases or decreases depending on the direction of electric field applied to it. IOC's are analogous to integrated circuits (IC's) utilized in semiconductor technology. The signal processing in an IC is totally electric whereas in an IOC it is both optical and electrical. The term "integrated" in "integrated optic chip" implies that the chip has both electrical and optical parts. One or more external electrical signal(s) is applied to one or more electrodes formed on an IOC and the electrical signals change the index of refraction of one or more waveguides adjacent to the electrodes. Changing the index of refraction of a waveguide produces a concomitant change in the intensity and/or phase of light passing through the waveguide. An IOC device is a device which includes one or more IOCs.

During the testing of multiple IOC devices, it is common practice to provide a separate laser light source for each IOC device. This procedure is labor intensive, is costly, and can also make it difficult to readily determine when a particular laser is not operating properly.

SUMMARY OF THE INVENTION

Therefore, it is a principal object of the invention to provide an improved method and apparatus for providing a source of light to test an IOC device or other optical circuit.

A further object of the instant invention is to provide a light source of the type described which is relatively inexpensive and which enables variations in the physical properties of the light source to be more readily identified during the testing of an IOC device or other optical circuit.

These and other, further and more specific objects and advantages of the invention will be apparent from the following detailed description thereof, taken in conjunction with the drawing, which depicts a light source constructed in accordance with the principles of the invention.

Briefly, in accordance with my invention, I provide improved apparatus for directing light into a plurality of optical circuits. The apparatus includes a system for producing broadband light; apparatus for splitting the broadband light into a plurality of beams each comprised of equivalent wavelengths of light; and, apparatus for directing each of the plurality of beams into a different one of the optical circuits.

In accordance with another embodiment of my invention, I provide an improved method for directing light into a plurality of optical circuits. The improved method includes the steps of providing a source of broadband light; splitting light from the source into a plurality of light beams each comprised of equivalent wavelengths of light; and, directing each of the plurality of light beams into a different one of said optical circuits.

BRIEF DESCRIPTION OF THE DRAWING

Turning now to the drawing, which depicts the presently preferred embodiment of the invention for the purpose of illustrating the practice thereof, and not by way of limitation, a source 10 of broadband light includes COMM 14, power 15, bias board 11, laser diode 12, and coupler/splitter 13.

DETAILED DESCRIPTION OF THE INVENTION

Laser diode 12 and coupler 13 are interconnected by a loop of erbium-doped fiber. Light from laser diode 12 excites erbium electrons in the fiber loop to a new energy level or orbit. When the electrons decay back to their original energy level or orbit, they emit secondary light. The secondary light is broadband light having a wavelength in the range of 1530 nm to 1560 nm. Broadband light is the amplified spontaneous emission of randomly polarized light. While the range of light wavelengths in broadband light can vary, the range of wavelengths is presently typically about ten to fifty nanometers wide. While the range of wavelengths in the broadband light being utilized is presently from about 1530 nm to 1560 nm, a fiber can be used that is doped with an element(s) or composition other than erbium and that produces a different range of wavelengths, for example 1420 to 1445 nm. The secondary light travels from the erbium fiber 12A to isolator-splifter unit 13. Unit 13 includes an isolator which protects laser diode 12 from reflections that travel back through fiber 12A toward diode 12. Unit 13 also functions to split the secondary light into a plurality of auxiliary beams each having an equivalent mix of wavelengths in the range of 1530 nm to 1560 nm. Each auxiliary beam is directed from unit 13 down a separate single mode (SM) fiber 16 to a separate polarizer 17, and is directed from polarizer 17 through a polarization maintaining (PM) fiber 18 into a separate IOC device 19. I.e., each auxiliary beams from unit 13 is directed to a separate, different IOC device.

Output from IOC device 19 travels through single mode fiber 25, into "bullet" bare fiber adapter 26, and into multimode fiber 27. Fiber 27 travels to circuit board enclosure 28, into and through a RS 232 connector, and to a circuit board 29. Board 29 is connected to a computer 30. Computer 30 is used to set controls on board 29 or to otherwise provide board 29 with commands to control the application of direct current to device 19 via circuitry 40 to cable 22 and to control via circuitry 40 the application of RF signals to device 19 via cable 23. Lead 33 is connected to a thermistor in an aluminum plate contacting and beneath IOC device 19.

Each IOC device has its own separate board 29 which receives output from and controls the testing of the IOC device. The test results for each IOC device are directed by its associated board 29 to computer 30 for storage and analysis. Computer 30 is connected to a monitor 31 and keyboard 32.

The RF cable is connected to device 19 with an SMA (sub miniature adaptor). The SMA is similar to a connector for coaxial cable. The female connector is on device 19. The male connector is on the end of cable 23, along with the SMA sleeve which threads over the female connector after the male connector is inserted in the female connector.

Device 19 also includes a connector which enables cable 22 to be attached to the connector and device 19.

The circuit board 29 analyzes the input from fiber 27 and sends the results of the analysis to computer 30 for storage.

Having described my invention in such terms as to enable those of skill in the art to understand and practice it, and having described the presently preferred embodiments thereof, I claim:

What is claimed is:

1. Apparatus for directing light into a plurality of optical circuits including (a) means for producing broadband light;
(b) means for splitting said broadband light into a plurality of beams each comprised of equivalent wavelengths of light; and,
(c) means for directing each of said plurality of beams into a different one of said optical circuits.

2. A method for directing light into a plurality of optical circuits, including the steps of (a) providing a source of broadband light;
(b) splitting light from said source into a plurality of light beams each comprised of equivalent wavelengths of light; and,
(c) directing each of said plurality of light beams into a different one of said optical circuits.

* * * * *